United States Patent [19]

Knobl et al.

[11] Patent Number: 5,443,275
[45] Date of Patent: Aug. 22, 1995

[54] CHUCK

[75] Inventors: Karl-Heinz Knobl, Trunkelsberg; Dieter Scheuthle, Kempten, both of Germany

[73] Assignee: Zettl GmbH CNC Präzisions- und Soderwerkzeuge, Dietmannsried, Germany

[21] Appl. No.: 153,868

[22] Filed: Oct. 1, 1993

Related U.S. Application Data

[63] Continuation of PCT/EP92/00756, Apr. 3, 1992.

[30] Foreign Application Priority Data

Apr. 4, 1991 [DE] Germany ............. 41 10 894.9

[51] Int. Cl.[6] .................................. B23B 31/173
[52] U.S. Cl. ..................... 279/60; 279/140; 279/902
[58] Field of Search ................... 279/60–66, 279/140, 902; 408/240

[56] References Cited

U.S. PATENT DOCUMENTS

| 4,527,809 | 7/1985 | Umbert | 279/64 |
|---|---|---|---|
| 4,902,025 | 2/1990 | Zimdars | 279/60 |

FOREIGN PATENT DOCUMENTS

| 691727 | 10/1930 | France | 279/60 |
|---|---|---|---|
| 497662 | 5/1930 | Germany . | |
| 823692 | 6/1952 | Germany | 279/60 |
| 882943 | 7/1953 | Germany | 279/60 |
| 3038637 | 5/1981 | Germany . | |
| 3048274 | 7/1982 | Germany . | |
| 3305733 | 9/1983 | Germany . | |
| 3222399 | 12/1983 | Germany . | |
| 3610671 | 10/1987 | Germany . | |
| 3713457 | 9/1988 | Germany . | |
| 3739165 | 6/1989 | Germany . | |
| 612855 | 11/1948 | United Kingdom | 279/60 |
| 621761 | 5/1949 | United Kingdom . | |

Primary Examiner—Steven C. Bishop
Attorney, Agent, or Firm—Nils H. Ljungman & Associates

[57] ABSTRACT

On a chuck, the clamping jaws can be adjusted axially by means of an internally threaded sleeve of a jackscrew actuator in one direction for clamping and in the other direction for release. When the jaws are adjusted in the clamping direction, the clamping jaws are moved radially inward by interaction with a jaw convergence sleeve; for an axial movement in the release direction, the clamping jaws are moved radially outward by interaction with jaw expansion means attached inside the jaw convergence sleeve. The internally threaded sleeve is designed on its one end as an expansion cage for the clamping jaws lying inside the convergence sleeve, and is centered by an adjacent sleeve extension in the base unit. The internally threaded sleeve is guided both inside the expansion cage and inside the sleeve extension centering on the guide sleeve.

21 Claims, 5 Drawing Sheets

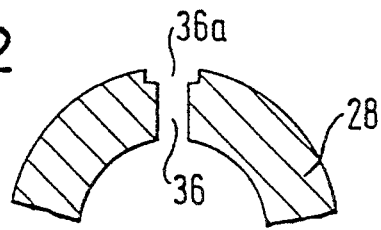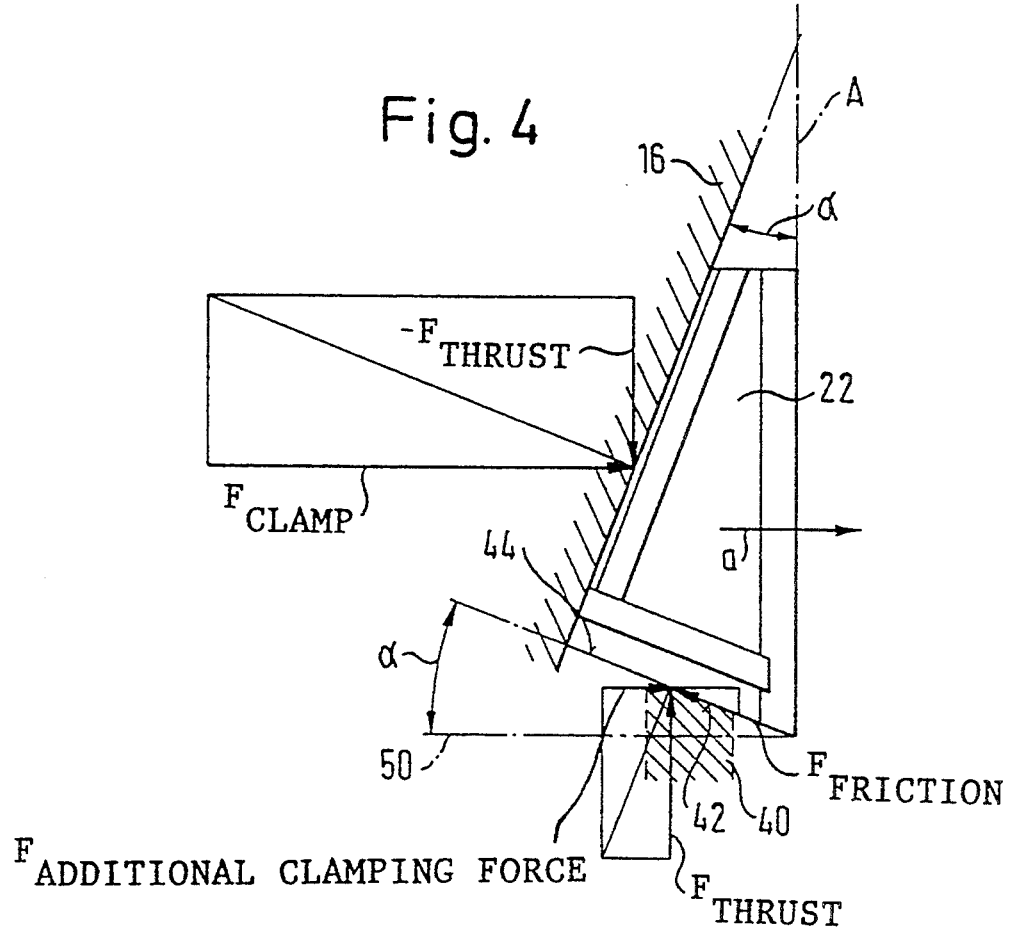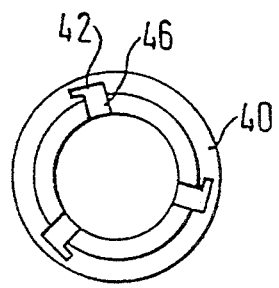

CHUCK

CONTINUING APPLICATION DATA

This application is a Continuation-In-Part application of International Application No. PCT/EP92/00756, filed on Apr. 3, 1992, which claims priority from Federal Republic of Germany Patent Application No. P 41 10 894.9, filed on Apr. 4, 1991, International Application No. PCT/EP92/00756 was pending as of the filing date of U.S. application Ser. No. 08/153,868 and the U.S. was an elected state in International Application No. PCT/EP92/00756.

BACKGROUND OF THE INVENTION

1. Field of the Invention

This invention relates to a chuck, comprising a base unit with an axis. The base unit has an add-on piece for the installation of the base unit on a chuck mount, in particular on a machine tool. On the end of the base unit away from the add-on piece, there is also a jaw convergence sleeve, whereby inside the jaw convergence sleeve there are also clamping jaws, whereby the clamping jaws are also guided by radially outward friction surfaces on the inside of the jaw convergence sleeve on convergence tracks, which enclose an acute angle with the axis. The clamping jaws also have radially inward tool clamping surfaces to exert a radial clamping force on the shank of the tool to be clamped, whereby the clamping jaws also have thrust absorption surfaces on the ends facing the add-on piece. The thrust absorption surfaces of the clamping jaws are also opposite the thrust surfaces of a thrust body, whereby the thrust body can be moved axially by drive means relative to the jaw convergence sleeve, to bring the tool clamping surfaces closer together to exert a clamping force against the shank of the tool in question.

2. Background Information

A chuck of this general type is disclosed in German Laid Open Patent Application No. 30 48 274 A1, and also in various instances which are or were in public use in at least the Federal Republic of Germany.

In a known configuration, the drive means essentially consists of a jackscrew actuator located in the base unit. This jackscrew actuator comprises an internally threaded sleeve being mounted in the base so that the sleeve can rotate but cannot move axially, and is mounted on the base by means of a thrust ball bearing. In the internally threaded sleeve, there is an externally threaded spindle, held by the engagement of the threads. The externally threaded spindle is made in one piece with a thrust body. The thrust body lies with thrust surfaces oriented orthogonally in relation to the axis of the chuck, in a thrust-transmitting connection with the thrust absorption surfaces of the clamping jaws. The thrust surfaces are an integral component of L-shaped grooves which run radially and orthogonally in relation to the axis, while the thrust absorption surfaces of the clamping jaws are integral components of complementary L-shaped profiles on the clamping jaws. The clamping jaws can thus move radially in relation to the thrust bodies, and can be moved by the thrust bodies in both axial directions. The jaw convergence sleeve is bolted to the base unit so that it cannot rotate. In the base unit, oriented tangentially to the internally threaded sleeve, there is a worm shaft which is engaged with a worm gear thread of the internally threaded sleeve. By turning the worm shaft, the internally-threaded sleeve can be made to rotate. The externally-threaded spindle and the thrust body connected to it as a single piece are held by means of the clamping jaws so that they cannot rotate in relation to the jaw convergence sleeve. A rotation of the internally threaded sleeve, initiated by activating the worm shaft, thus causes an axial movement of the externally threaded spindle, the thrust body, and the clamping jaws which are connected to the thrust body, so that each of these components move axially together. The clamping jaws thereby move independently of the direction of the axial movement of the externally threaded spindle, guided by the convergence tracks of the jaw convergence sleeve, so that, as a function of the direction of rotation of the internally threaded sleeve, the clamping jaws are either moved toward the shank of a tool to be clamped, or are raised away from it.

The known embodiment just described, which by and large has proven reliable, nevertheless has several problems.

The first problem is as follows: The clamping jaws are moved by the wedging action between the convergence tracks and the radially outward friction surfaces of the clamping jaws in the radial direction toward the shank of the tool to be chucked, and are pressed against the tool shank. In the phase during which pressure is applied, there tends to be a high friction force between the thrust surfaces and the thrust absorption surfaces of the clamping jaws, the high friction force being caused by the high axial thrust between the two surfaces. This friction force tends to act against the radially inward clamping force on the shank of the tool to be chucked caused by the wedging action between the convergence tracks and the radially outward friction surfaces of the clamping jaws, caused by the wedging action. In other words, the radial clamping force exerted by the clamping jaws on the respective tool shank tends to be lower on the ends of the clamping jaws toward the thrust body than would correspond to a uniform distribution of the wedging force acting on the clamping jaws over the entire length of the jaws. That can often lead to situations in which the tool shank is not clamped as tightly as desired in these terminal areas of the clamping jaws.

An additional problem is as follows: The worm shaft both causes the clamping jaws to be brought closer to the tool shank, and also generates the clamping force with which the clamping jaws are in contact with the tool shank. The clamping force exerted on the tool shank must essentially be very great, in view of the high torques which are transmitted between the chuck and the tool during operation. That means that between the worm shaft and the worm gear of the internally-threaded sleeve, essentially an extremely high transmission ratio must be selected to be able to apply the necessary clamping forces. This extremely high transmission ratio also means that very high speeds of revolution are necessary on the worm shaft to produce a large radial adjustment movement of the clamping jaws, such as if a previously-clamped tool with a large shank diameter is being replaced by a new tool with a significantly smaller shank diameter. Consequently, the chuck tends to become more complicated to operate. Even if the transmission ratio on the worm gear is set very high to be able to apply high clamping forces by means of the clamping jaws, the clamping forces applied to the clamping jaws by turning the worm shaft by means of a lathe tool are not always sufficient. It should be noted that it is frequently necessary to allow the chuck, as an add-on piece of a rotating machine tool spindle, to rotate in different directions. But if the clamping force is produced, among other things, by the threaded engagement between the externally-threaded spindle and the internally-threaded sleeve, the torque which must be transmitted has a tendency to increase the radial clamping force of the jaws only in one direction of rotation.

An additional problem is the following: On the known system just described, of course, the internally-threaded sleeve of the jackscrew actuator is supported in the radial direction by the radial bearing on the base unit. But on the other hand, the externally-threaded spindle, in its radial position, is essentially fixed exclusively by the threaded engagement with the internally threaded sleeve. When determining the play or clearance of the mated threads of the internally-threaded sleeve and the externally-threaded spindle, it is essentially not possible to select a fit which is as close as might be desirable. Particularly, such a close fit would tend to restrict the smooth running of the jackscrew actuator, which smooth running is generally necessary for the operation of the chuck. Consequently, it must generally be expected that the externally-threaded spindle will be capable of certain radial displacements in relation to the axis of the chuck. The radial displacements tend to mean that the axis of rotation of the machine spindle essentially no longer coincides with the axis of the tool clamped in the chuck (positional error-=alignment error). The result is noticeable in the form of eccentricities, or radial deviations, on the tool clamped in the chuck.

At very high speeds of rotation of the machine spindle, these radial shifts lead to balance errors, which generally cannot be eliminated by prior balancing of the chuck, since the offset of the externally-threaded spindle in relation to the axis of the chuck tends to assume different values in relation to the radial position and the magnitude of the eccentricity, each time the tools are re-chucked.

An object of the invention is therefore to eliminate the problems which still exist with known chucks.

Under one aspect of the invention, the thrust absorption surfaces of the clamping jaws and the thrust surfaces of the thrust body—considered respectively in a plane containing the axis—preferably enclose an acute angle with the axis, such that when a thrust is exerted by the thrust body on the clamping jaws, causing the clamping jaws to clamp the chuck, a clamping force component directed radially inward is transmitted from the thrust surfaces to the thrust absorption surfaces.

As a result of this measure, when a tool shank is clamped inside the clamping jaws, as a result of the wedging action between the thrust surfaces of the thrust body and the thrust absorption surfaces of the clamping jaws, there is essentially a clamping force component directed radially inward on the clamping jaws. As a result of this clamping force component, the tendency to reduce the clamping force, which occurs as a consequence of the friction forces between the thrust surfaces of the thrust body and the thrust absorption surfaces of the clamping jaws, can essentially be compensated in whole or in part, so that depending on the size of the acute angle enclosed by the thrust surfaces and the thrust absorption surfaces with the axis, the profile of the force curve can essentially be changed in the axial direction of the tool clamping surfaces of the clamping jaws as desired. In addition, on account of the wedge effect between the thrust surfaces of the thrust body on one hand and the thrust absorption surfaces of the clamping jaws on the other hand, the transmission ratio between the point of application of force of the transmission means on the one hand and the clamping jaws on the other hand can be varied, and in particular increased, in the sense of increasing the radial clamping forces exerted on the tool shank by the clamping jaws.

When this description speaks of a tool with a tool shank, it is merely because that is a frequent application of the chuck according to the invention. It is altogether conceivable, however, that in other applications, the clamping jaws will not be used to clamp a tool shank, but perhaps even the shank of a workpiece being worked on by a stationary tool.

There is a particularly favorable distribution of the clamping force on the clamping jaws if, when considered in a plane containing the axis, the thrust absorption surfaces and the thrust surfaces on one hand, and the corresponding convergence track on the other hand, enclose an angle of approximately 90 degrees.

As disclosed in German Laid Open Patent Application No. 30 48 274 A1 indicated above, a thrust absorption surface and a corresponding thrust surface can be portions of the surface of interlocking profiles, which connect the respective clamping jaws so that they are moved axially with the thrust body in both axial directions. As a result of this measure, regardless of the direction of operation of the transmission means, the clamping jaws are always essentially carried along by the thrust body in the axial direction, i.e. in particular when the corresponding tool shank is to be removed from the chuck.

As also known by prior public use, at least in the Federal Republic of Germany, it is possible to guide the clamping jaws inside the jaw convergence sleeve by means of a conical expansion cage, which essentially guarantees a radial retraction movement of the clamping jaws away from the part being clamped, when there is a corresponding axial movement of the thrust body. This measure essentially guarantees that when the clamping jaws are released by the respective transmission means, i.e. in particular by the jackscrew actuator, they lift up automatically, away from the shank of the respective tool or workpiece.

In contrast to the embodiment disclosed in German Laid Open Patent Application No. 30 48 274 A1, in which the thrust body is connected to an externally-threaded spindle, the invention also teaches that: the thrust body is connected to an internally threaded sleeve of a jackscrew actuator; an externally threaded spindle is fixed in the base unit so that it cannot rotate; the jaw convergence sleeve is mounted on the base body so that it can rotate but cannot move axially; and the thrust body, and with it the internally threaded sleeve, is connected by the clamping jaws so that it rotates together with the jaw convergence sleeve. This configuration is particularly favorable, because then the thrust surfaces are automatically applied radially outward, without any special configuration means, against the internally threaded sleeve and the thrust body. The overall result is a simpler and more compact mechanical structure.

The conical expansion cage can preferably be connected to the convergence sleeve, i.e. it can be fixed to it both axially and also in the circumferential direction. On one hand, the advantage of such a configuration is that taking into consideration the requirement for continuous contact between the clamping jaws and the convergence tracks, the convergence sleeve can be easily manufactured as a turned part. This configuration is in contrast to another conceivable embodiment, in which the guide profiles to guide the clamping jaws are located directly on the inside of the jaw convergence sleeve. On the other hand, it is also possible that the conical expansion cage can be radially mounted with a cylindrical sleeve extension on the inside circumferential surface of an axial hole in the base unit, and that the internally threaded sleeve can be mounted and axially guided inside the cylindrical sleeve extension. This latter possibility means that, essentially, both parts of a jackscrew actuator can be radially fixed in the radial direction directly on the base unit, and can thus be installed without any balance error. It is a simple matter to also fix the externally threaded spindle to its end, away from the clamping jaws in the radial direction, projecting beyond the internally threaded sleeve, and well within the base unit.

The problem indicated above of the complexity of moving the clamping jaws close to the tool shank to achieve sufficient clamping forces between the clamping jaws and the tool shank or, stated inversely, the problem of not being able to achieve sufficient clamping force between the clamping jaws and the tool shank with a facilitated movement of the clamping jaws both toward and away from the tool shank, can be easily solved by having the externally threaded spindle acted on, in an axial direction, by a mechanism which increases the clamping force. Thus the adjustment by means of the jackscrew actuator on one hand, and the clamping force application means of the mechanism which increases the clamping force on the other hand, are preferably independent of one another. Consequently, the jackscrew actuator can be configured so that it only takes a few rotations, e.g. of the jaw convergence sleeve, to travel a large radial adjustment distance, and so that on the other hand, it only takes a small movement of the mechanism which increases the clamping force to apply a large clamping force.

The idea of using a jaw convergence mechanism on one hand to move the clamping jaws close to the tool shank, and a mechanism to increase the clamping force on the other hand to generate the clamping force, is essentially independent of the idea discussed above, i.e. locating the thrust surfaces and the thrust absorption services at an acute angle to the axis of the chuck. In other words, the incorporation of a jaw convergence mechanism and of a mechanism to increase the clamping force can essentially be applied successfully, even if, as in known arrangements, the thrust surfaces of the thrust body and the thrust absorption surfaces of the clamping jaws are oriented orthogonally in relation to the axis of the chuck. The configuration of the jaw convergence mechanism and of the mechanism to increase the clamping force is essentially not mandatory in the embodiments discussed below. The mechanism to increase the clamping force in particular can be used in various embodiments. It is possible, for example, to use a wedge mechanism, a worm gear transmission, a toggle mechanism or preferably a cam mechanism as the mechanism to increase the thrust. For the jaw convergence mechanism, various types of mechanisms can also be used, whereby in this case a jackscrew actuator is preferably used, e.g. so that the jaw convergence mechanism is essentially formed by a jackscrew actuator oriented coaxially in relation to the base unit, and on one hand acts on the thrust body, and on the other hand is acted on by the mechanism to increase the clamping force.

In one preferred embodiment, the jackscrew actuator can be adjusted by turning the clamping jaw convergence sleeve in relation to the base unit. This capability, which is common on hand-held power drills, can be used on the chucks of the high-powered machine tools in question here precisely because of the addition of the mechanism which increases the clamping force, and therefore the rotational movement applied to the jaw convergence sleeve does not also have to apply the high clamping forces which are required.

In one preferred embodiment of the invention, the mechanism which increases the clamping force preferably comprises a camshaft, mounted essentially radially in relation to the axis of the base unit and mounted in the base unit, with a cam or cam body. The jaw convergence mechanism is in contact with this cam body, and the jaw convergence mechanism can in turn be a jackscrew actuator. The camshaft can also preferably be designed with intervention surfaces, e.g. Allen screws, for the engagement of an Allen wrench to rotate the camshaft. The cam shaft can preferably run through the base unit radially, or, in other words, diametrically. That significantly facilitates the solution to the problem of achieving the correct balance, because a camshaft which runs diametrically through the base unit can be executed with small balance errors, in particular if the camshaft extends over the entire diameter of the base unit. In that case, it is not difficult to achieve complete balance. In addition, as a result of the rotation of the radially or diametrically mounted camshaft, there is practically no change in the out-of-balance condition, with regard to its eccentricity, which is very small anyway, so that the system can essentially always be in correct balance, regardless of the position of the camshaft. Moreover, it is easily possible, even from the point of view of the eccentricity, to achieve the correct balance for operation by performing the balancing operation when the camshaft is in the clamped position. To facilitate handling, it is possible to have the camshaft held by prestressing means in a non-clamped position. The camshaft is then automatically fixed in the clamped position by the self-locking interaction between the cam body and the part of the jaw convergence mechanism upon which it acts. The angle of rotation of the camshaft can be restricted by stops to facilitate handling and to prevent overtightening.

If both a jaw convergence mechanism and a mechanism to increase the clamping force are present, then, when there is a change in the direction of rotation, the problem of the automatic release of the clamping jaws can be easily solved, because the jaw convergence mechanism is locked by clamping the mechanism to increase the clamping force. In the event that the jaw convergence mechanism is activated by torsion on the jaw convergence sleeve, it is advantageous, with regard to the locking of the jaw convergence mechanism by clamping of the mechanism, to increase the clamping force if an axial safety device on the jaw convergence mechanism acts as a brake on rotation between the jaw convergence sleeve and the base unit, when an axial load is exerted on the jaw convergence sleeve by the clamping jaws, as a result of the action by the mechanism which increases the clamping force on the clamping jaws.

The idea that, if a jackscrew actuator acts as the jaw convergence mechanism and/or as the mechanism to increase the clamping force, the two parts of this jackscrew actuator should preferably be mounted individually and independently of one another in the radial direction on the base unit, can be applied with advantage, independently of the characteristics of the invention discussed above, i.e. in particular independently of the acute-angle orientation of the thrust surfaces and the thrust absorption surfaces, and independent of the functional separation between a jaw convergence mechanism and a mechanism to increase the clamping force, in terms of improving the balance of the chuck. This is also true for a particularly preferred configuration, in which an internally-threaded sleeve of the jackscrew actuator is mounted inside a sleeve extension of a conical expansion cage. The idea that: the thrust body is connected to the internally-threaded sleeve; the externally-threaded spindle does not rotate in relation to the base unit; the jaw convergence sleeve is mounted so that it can rotate but cannot move axially on the base unit; and the internally-threaded sleeve is connected by means of the clamping jaws to the jaw convergence sleeve so that they rotate together; can also essentially be applied independently of the other features of the invention.

The idea of mounting a jaw convergence sleeve on the base unit so that it can rotate but cannot move axially is also essentially known, on the basis of prior public disclosure at least in the Federal Republic of Germany. But the teaching that the jaw convergence sleeve can be mounted with an inside circumferential surface on an outside circumferential surface of the base unit by means of a needle bearing, so that it can rotate but not move radially, is essentially new and essentially independent of the other teachings of the invention. This proposal essentially makes it possible, in a relatively simple manner, to reduce the danger of the occurrence of out-of-balance conditions as a result of an eccentric mounting of the jaw convergence sleeve. At this point, it should be noted that if the jaw convergence sleeve is mounted so that it can rotate on the base unit, to adjust the clamping jaws by direct or indirect rotational action on the jaw convergence sleeve, the fit of the jaw convergence sleeve on the base unit essentially cannot be made as tight as might otherwise be desired, to avoid friction resistance. But if, as suggested here, there is a needle bearing between the jaw convergence sleeve and the base unit, then without the risk of excessive friction resistance, there can essentially be a close fit of the needle bearing rollers between the surfaces in contact with it of the base unit and of the jaw convergence sleeve, and thus a radial offset of the jaw convergence sleeve, with the consequence that imbalances can be completely eliminated. For this purpose, it is essentially not even necessary to have a radial prestress exerted on the needles between the surfaces in contact with them radially inward and radially outward. It is essentially sufficient to use needles which have particularly close tolerances and correspond exactly to the annular gap between the ring surfaces of the jaw convergence sleeve and the base unit in contact with it.

In one embodiment of the invention, a mechanism to increase the clamping force preferably acts on a jaw convergence mechanism. But this sequence of the mechanism to increase the clamping force and the jaw convergence mechanism is essentially not mandatory. It would also be theoretically possible to change the sequence, i.e. to place the jaw convergence mechanism in direct contact with the base unit, and to insert the mechanism to increase the clamping force between the jaw convergence mechanism and the clamping jaws.

In particular, the invention essentially relates to a chuck, comprising a base unit with an axis, whereby this base unit is designed for external mounting on a chuck mounting, in particular of a machine tool. A jaw convergence sleeve is centrally located on the base unit, in which axially movable clamping jaws are also located inside the jaw convergence sleeve. For the axial movement of the clamping jaws in the direction of clamping and releasing, there is also a jackscrew actuator extending along the axis, which moves axially together with the clamping jaws, but which allows an essentially radial movement of the clamping jaws in relation to the jackscrew actuator. The clamping jaws are also guided by means of radially outward friction surfaces on the inside of the jaw convergence sleeve on convergence tracks. The convergence tracks enclose an acute angle with the axis, so that the clamping jaws are moved radially inward for a movement in the clamping direction. Also, inside the jaw convergence sleeve, jaw expansion means are engaged with the clamping jaws, so that the clamping jaws can be moved radially outward for a movement in the release direction. The jackscrew actuator includes an externally threaded spindle which can be axially supported against the base unit, as well as an internally threaded sleeve which transmits the clamping force as well as the releasing force. The internally threaded sleeve is guided on an inside circumferential surface which centers the sleeve in relation to the base unit. The externally threaded spindle is also centered on the base unit independently of the threaded engagement with the internally threaded sleeve.

Such a chuck is disclosed in German Laid Open Patent Application No. 36 10 671. In this embodiment of the prior art, when a small-diameter tool shank is clamped, the end of the internally threaded sleeve facing the clamping jaws projects far into the interior of the convergence sleeve, where it is both essentially unguided and unsupported. That can generally lead to faulty gripping and thus to out-of-balance conditions.

OBJECT OF THE INVENTION

Generally, it is an object of the invention is to achieve the maximum freedom from imbalance and smooth operation of the jackscrew actuator.

SUMMARY OF THE INVENTION

The invention teaches that this object can be achieved in accordance with the invention, in that the inside circumferential surface which centers the internally threaded sleeve is preferably made on a guide sleeve, which guide sleeve is preferably designed in the vicinity of the jaw convergence sleeve with radial slots forming an expansion cage which acts as the jaw expansion means for the clamping jaws, and which guide sleeve is preferably designed in an adjacent area as a sleeve extension with an outside circumferential surface centered on the base unit. Preferably, the sleeve extension overlaps the area of threaded engagement between the externally threaded spindle and the internally threaded sleeve in the axial direction. The inside circumferential surface which centers the internally threaded sleeve is preferably provided, in this vicinity overlapping the threaded engagement area between the internally threaded sleeve and the externally threaded spindle, and also in the vicinity of the expansion cage on the guide sleeve, such that the internally threaded sleeve is radially supported in each axial position at least on the two axially-separated terminal areas of its outside circumferential surface on the inside circumferential surface which centers the internally threaded sleeve.

The precision of the guidance of the internally threaded sleeve can essentially be increased even further by centering the expansion cage by means of a conical outside circumferential surface on a conical inside circumferential surface of the convergence sleeve.

To achieve the maximum possible precision in centering the expansion cage on the conical inside circumferential surface of the convergence sleeve, and to avoid unintentional faulty gripping of the expansion cage, the guide sleeve, in particular in the vicinity of a transition shoulder between the expansion cage and the sleeve extension, can preferably be positioned axially on a stop surface of the base unit, the convergence sleeve can be axially positioned on a stop surface of the base unit, and/or the convergence sleeve can preferably be centered on the base unit by a pair of circumferential surfaces in contact with one another.

The radial support of the internally threaded sleeve in two areas of its outside circumferential surface near its ends, on the inside circumferential surface which centers it, can preferably be achieved in particular because the internally threaded sleeve is in contact in each axial position essentially over its entire length with the inside circumferential surface which centers it.

The guidance principle indicated above for the internally threaded sleeve can essentially be applied: if the guide sleeve is connected to the convergence sleeve so that they rotate together; if the convergence sleeve is mounted on the base unit so that it can rotate, but cannot move axially; if the internally threaded sleeve is connected by means of the clamping jaws so that it rotates together with the convergence sleeve; and if the externally threaded spindle is fastened to the base unit so that it does not rotate. But the guidance principle indicated above can also essentially be applied if: the convergence sleeve is connected to the base unit so that it cannot rotate, the guide sleeve is fastened to the base unit so that it cannot rotate; the internally threaded sleeve is fastened to the guide sleeve via the clamping jaws so that it cannot rotate; and the externally threaded spindle is mounted in the base unit so that it can rotate, and can be driven by external drive means.

In the embodiment described immediately above, it is possible in particular that the drive means comprise a worm shaft mounted so that the worm shaft can rotate in the base unit and can intersect the axis of the base unit. As such, the worm shaft is preferably engaged with a worm gear of the externally threaded spindle, and has an intervention mechanism which can preferably be accessible from the outside.

In summary, one aspect of the invention resides broadly in a chuck for being mounted on a tool and for clamping about an object, the chuck comprising: a central longitudinal axis; base unit means for being mounted on the tool; jaw convergence means being disposed within the base unit means; a plurality of clamping jaws being mounted within the jaw convergence means, the clamping jaws being movable along the longitudinal axis; the jaw convergence means being configured for radially converging the clamping jaws upon axial movement of the clamping jaws, to effect clamping of the clamping jaws about the object; thrust means for axially displacing the clamping jaws to effect clamping of the clamping jaws about the object; spindle means being threadedly engaged with the thrust means for axially displacing the thrust means to thus displace the clamping jaws; means for effecting relative rotational displacement between the spindle means and the thrust means to axially displace the thrust means; guide sleeve means for guiding the axial displacement of the thrust means; the guide sleeve means comprising an axial cylindrical passage for guiding the axial displacement of the thrust means, the thrust means being disposed within the axial cylindrical passage; the thrust means comprising a first end portion and a second end portion, the first end portion being disposed towards the clamping jaws and the second end portion being disposed away from the clamping jaws; the thrust means being radially supported by the guide sleeve means at least at the first end portion and the second end portion; the first end portion of the thrust means extending substantially completely across the axial bore such that the thrust means is radially supported by the guide sleeve means at the first end portion; and the second end portion of the thrust means extending substantially completely across the axial bore such that the thrust means is radially supported by the guide sleeve means at the second end portion.

Another aspect of the invention resides broadly in a chuck for being mounted on a tool and for clamping about an object, the chuck comprising: a central longitudinal axis; base unit means for being mounted on the tool; jaw convergence means being disposed within the base unit means; a plurality of clamping jaws being mounted within the jaw convergence means, the clamping jaws being movable along the longitudinal axis; the jaw convergence means being configured for radially converging the clamping jaws upon axial movement of the clamping jaws, to effect clamping of the clamping jaws about the object; thrust means for axially displacing the clamping jaws to effect clamping of the clamping jaws about the object; spindle means being threadedly engaged with the thrust means for axially displacing the thrust means to thus displace the clamping jaws; means for effecting relative rotational displacement between the spindle means and the thrust means to axially displace the thrust means; guide sleeve means for guiding the axial displacement of the thrust means; the chuck having an axial direction defined along the central longitudinal axis; the chuck having a front portion and a rear portion, the front portion for being disposed axially towards the workpiece, the rear portion for being disposed axially away from the workpiece; the thrust means and the spindle means for being threadedly engaged along an area of threaded engagement, the area of threaded engagement being substantially fixed with respect to the axial direction of the chuck; and the guide sleeve means being disposed to overlap the area of threaded engagement of the thrust means and the spindle means.

Yet another aspect of the invention resides broadly in a machine tool comprising: a chuck being mounted on the machine tool and for clamping about an object; the chuck comprising: a central longitudinal axis; base unit means for being mounted on the tool; jaw convergence means being disposed within the base unit means; a plurality of clamping jaws being mounted within the jaw convergence means, the clamping jaws being movable along the longitudinal axis; the jaw convergence means being configured for radially converging the clamping jaws upon axial movement of the clamping jaws, to effect clamping of the clamping jaws about the object; thrust means for axially displacing the clamping jaws to effect clamping of the clamping jaws about the object; spindle means being threadedly engaged with the thrust means for axially displacing the thrust means to thus displace the clamping jaws; means for effecting relative rotational displacement between the spindle means and the thrust means to axially displace the thrust means; guide sleeve means for guiding the axial displacement of the thrust means; at least one of the following groups of features A) and B): A) the guide sleeve means comprising an axial cylindrical passage for guiding the axial displacement of the thrust means, the thrust means being disposed within the axial cylindrical passage; the thrust means comprising a first end portion and a second end portion, the first end portion being disposed towards the clamping jaws and the second end portion being disposed away from the clamping jaws; the thrust means being radially supported by the guide sleeve means at least at the first end portion and the second end portion; the first end portion of the thrust means extending substantially completely across the axial bore such that the thrust means is radially supported by the guide sleeve means at the first end portion; and the second end portion of the thrust means extending substantially completely across the axial bore such that the thrust means is radially supported by the guide sleeve means at the second end portion; and B) the chuck having an axial direction defined along the central longitudinal axis; the chuck having a front portion and a rear portion, the front portion for being disposed axially towards the workpiece, the rear portion for being disposed axially away from the workpiece; the thrust means and the spindle means for being threadedly engaged along an area of threaded engagement, the area of threaded engagement being substantially fixed with respect to the axial direction of the chuck; and the guide sleeve means being disposed to overlap the area of threaded engagement of the thrust means and the spindle means.

BRIEF DESCRIPTION OF THE DRAWINGS

The invention is explained in greater detail below with reference to the accompanying figures, wherein:

FIG. 2 is a cross section through the expansion cage along line II—II in FIG. 1;

FIG. 3 is a view of the thrust body in the direction of arrow III in FIG. 1;

FIG. 4 is a diagram of the forces on the clamping jaws;

DESCRIPTION OF THE PREFERRED EMBODIMENTS

Figure 1:
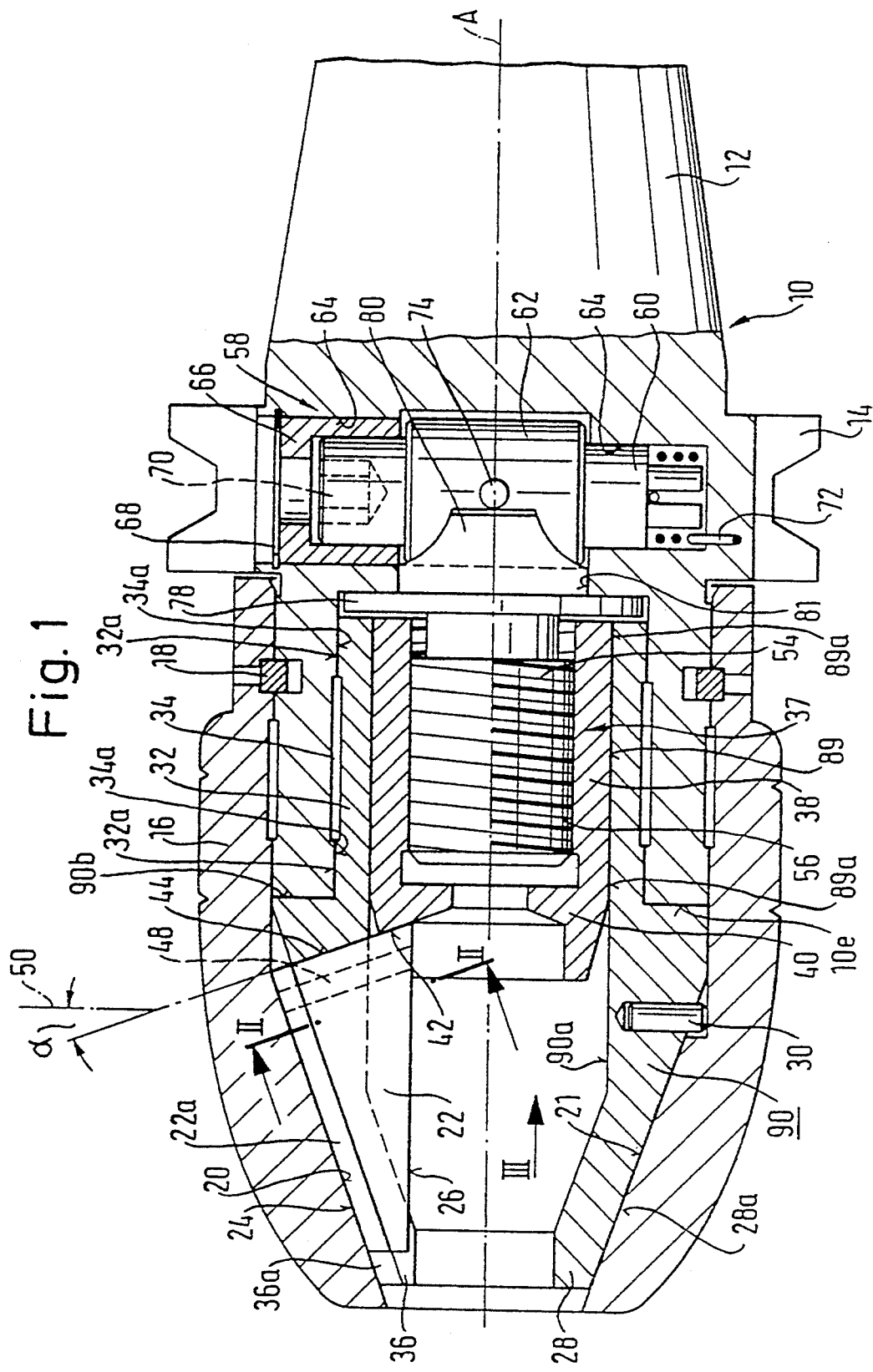
FIG. 1 is a longitudinal section through a first embodiment of a chuck according to the invention.

In FIG. 1, a base unit in general is designated 10. This base unit 10 preferably comprises an add-on piece 12 in the form of a male taper for introduction into a female taper of a rotating spindle. Preferably attached to the male taper 12 is a flange 14, which has a gripper groove. The male taper 12 is preferably clamped by a draw-in device located inside the respective spindle, which interacts with a retention knob on the end of the male taper 12. The gripper groove is preferably used to grip and transport the chuck by means of a handling device.

A jaw convergence sleeve 16 is also preferably mounted on the base unit 10 so that it can rotate, and is preferably axially secured by a retaining ring 18. The jaw convergence sleeve 16 preferably has an essentially conical inside circumference, and in the vicinity of this conical inside circumference, there are preferably a number of convergence tracks 20, which converge in the axial direction A of the chuck. Clamping jaws 22 with radially outward friction surfaces 24 are preferably guided on these convergence tracks 20. By axially displacing the clamping jaws 22 to the left in the direction of axis A, the clamping jaws 22 can essentially be moved radially inward, with the result that their radially inward tool clamping surfaces 26 act on, for example, a tool shank (not shown). There are several, e.g. preferably three, clamping jaws 22 distributed over the inside circumference of the jaw convergence sleeve 16. The distribution of these individual clamping jaws 22 around the axis A can preferably be defined by an expansion cage 28. The expansion cage 28 is preferably fastened to the jaw convergence sleeve 16 by a pin 30, so that it essentially cannot move axially or peripherally. The expansion cage 28 preferably has a sleeve extension 32, which is mounted so that the sleeve extension 32 can rotate in a hole 34 in the base unit 10.

FIG. 2 shows a partial section through the expansion cage 28. The expansion cage 28 preferably has slots 36, in which the clamping jaws 22 are guided. The slots 36 are preferably widened on their radially external ends to form a guide groove 36a. In these guide grooves 36, T-shaped rear areas 22a, as shown in FIG. 1, of the clamping jaws 22 are preferably guided so that there is essentially constant contact between the radially outward friction surfaces 24 of the clamping jaws 22 and the convergence tracks 20, regardless of the position of the clamping jaws 22 in the longitudinal direction of axis A. Referring again to FIG. 1, inside the sleeve extension 32 there is preferably an internally threaded sleeve 38, mounted so that it is radially stationary but can move axially. This internally threaded sleeve 38 is preferably connected, on its left end as shown in FIG. 1, to a thrust body 40, so that it is essentially one piece with the thrust body 40. The thrust body 40, as shown in the upper half of FIG. 1, is preferably in contact with thrust surfaces 42 on thrust absorption surfaces 44 of the clamping jaws 22. The thrust surfaces 42, as shown in FIG. 3, are preferably components of L-shaped grooves 46 of the thrust body 40, as shown in FIG. 1, and these L-shaped grooves 46 preferably hold matching profiles 48 on the right-hand ends of the clamping jaws 22 in FIG. 1. It is generally important that the thrust surfaces 42 of the thrust body 40 and the thrust absorption surfaces 44 of the clamping jaws 22 enclose an angle (alpha) in relation to a surface 50 orthogonal to axis A.

If the thrust body 40 is moved to the left in the axial direction A, the clamping jaws 22 are also essentially moved to the left along the convergence tracks 20, whereby the matching profiles 48 are moved essentially radially inward in the L-shaped grooves 46.

If the thrust body 40 is moved to the right in the axial direction A, the clamping jaws 22 are also essentially moved to the right by the thrust body 40, and also via the L-shaped grooves 46 and the matching profiles 48. The radially outward friction surfaces 24 of the clamping jaws 22 thereby essentially remain engaged with the convergence tracks 20, as a result of the guidance of the rear areas 22a in the guide grooves 36a. That means that, when there is an axial displacement to the right, the clamping jaws 22 are essentially moved radially outward, and their tool clamping surfaces 26 are lifted up from the shank of the respective tool. The radial outward movement of the clamping jaws 22 essentially means that the L-shaped matching profiles 48 are also moved essentially radially outward in the L-shaped grooves 46.

The axial movement of the thrust body 40 is preferably produced by a jackscrew actuator 37. This jackscrew actuator 37, in addition to the above-mentioned internally threaded sleeve 38, preferably comprises an externally threaded spindle 54. Additional details will be given below of the mounting of this externally threaded spindle 54 in the base unit 10.

For the moment, to explain the action of the jackscrew actuator 37, it will be assumed that the externally threaded spindle 54 is axially and radially stationary and cannot rotate inside the base unit 10. The externally threaded spindle 54 is preferably engaged with the internally threaded sleeve 38 by means of a square-threaded left-hand thread 56 with threads having a rectangular cross section.

When the jaw convergence sleeve 16 is rotated, the expansion cage 28 essentially rotates with jaw convergence sleeve 16, and thus the clamping jaws 22 are also essentially rotated by means of the expansion cage 28. The clamping jaws 22, on account of the engagement of the matching L-shaped profiles 48 in the L-shaped grooves 46, thereby also essentially move the thrust body 40 in the direction of rotation, and thus also the internally threaded sleeve 38. If the jaw convergence sleeve 16 is rotated clockwise, the internally threaded sleeve 38 is therefore also rotated in relation to the externally threaded spindle 54, which spindle is preferably stationary in the axial and circumferential directions. Since the thread 56 between the internally threaded sleeve 38 and the externally threaded spindle 54 is preferably a left-hand thread, then a rotation of the jaw convergence sleeve 16, and therefore also of the internally threaded sleeve 38 clockwise, essentially results in an axial movement of the internally threaded sleeve 38, and thus also of the thrust body 40 to the left, with the consequence that the clamping jaws 22 are moved radially inward. The reverse is true for a rotational movement of the jaw convergence sleeve counterclockwise. By rotating the jaw convergence sleeve 16, therefore, the clamping jaws 22 can be brought closer together, and these clamping jaws 22 can be moved toward or away from the respective tool shank, in a manner which is altogether conventional and customary for a technician with practical experience—rather like the chucks on simple hand-held power drills.

However, the torque which must be applied by hand to the jaw convergence sleeve 16 may not be sufficient under all circumstances to achieve the necessary radial clamping force between the clamping jaws 22 and the respective tool shank. Of course, on account of the square-threaded configuration of the thread 56, it would essentially be possible to achieve a transmission ratio which also allows higher radial clamping forces between the clamping jaws 22 and the respective tool shank. It can also be assumed that when the machine tool spindle is rotated clockwise, a self-tightening of the thread 56 will essentially take place, thereby increasing the radial clamping force between the clamping jaws 22 and the tool shank. But it must also be recalled that it is altogether possible that very high torques may need to be transmitted by the clamping jaws 22 to the tool shank, and in particular, under certain circumstances, that the machine tool spindle may also need to be switched from right-hand operation to left-hand operation, so that the self-locking action which was guaranteed in one direction of rotation is absent when the direction of rotation is reversed, and is replaced by a tendency for the tool shank to come loose.

Figure 5:
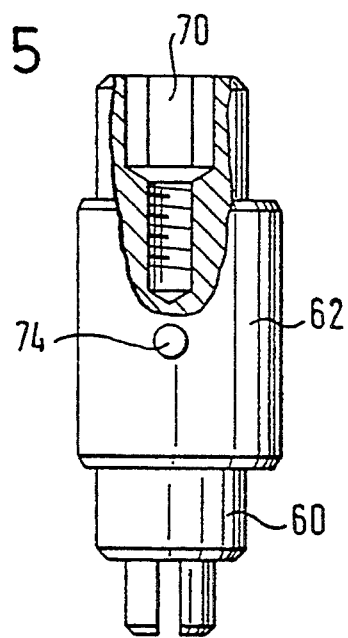
FIG. 5 is a cam of a mechanism to increase the clamping force.
Figure 6:
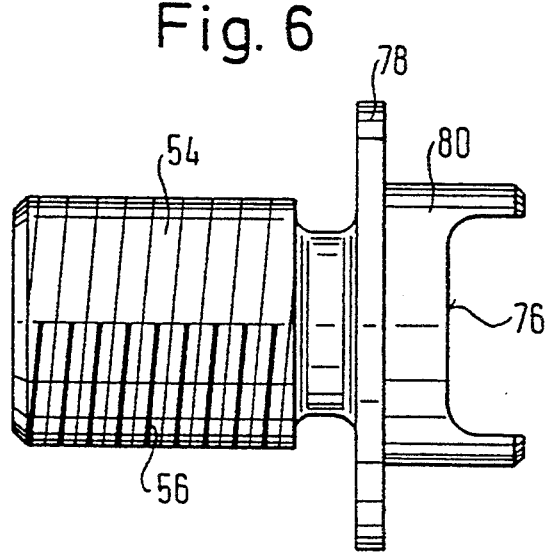
FIG. 6 shows an externally threaded spindle acted on by the cam body, of a jaw convergence mechanism designed as a jackscrew activator.

Now, to be able to meet all the clamping force requirements even when the direction of rotation changes, in addition to the jackscrew actuator 37, which can be used as a jaw convergence mechanism, there can also preferably be a mechanism to increase the clamping force. Such a mechanism is designated in general as 58. This mechanism to increase the clamping force preferably includes a camshaft 60 with a cam 62 located on it. The camshaft 60 is preferably mounted so that it can rotate in a stepped radial hole 64 in the base unit 10. With regard to the installation and removal of the camshaft 60, in the upper portion of FIG. 1 there is preferably a bearing bushing 66, which is preferably axially fixed by means of a retaining ring 68 in the base unit 10. FIG. 5 shows additional details of the configuration of the camshaft 60 and of the cam 62. FIG. 5 shows that, on one end of the camshaft 60, there can preferably be an Allen screw 70 to apply an Allen wrench. The camshaft 60 is preferably prestressed by a torsion spring 72 in a first direction of rotation, i.e. up to the point where it encounters a stop pin 74 with a stop. The cam 62 is preferably in contact with a cup 76 on the externally threaded spindle 54. FIG. 6 indicates additional details of the externally threaded spindle 54. The externally threaded spindle 54 preferably has a radial flange 78 which, as shown in FIG. 1, is a short distance from the right end of the sleeve extension 32. The externally threaded spindle 54 also preferably has a molding 80, which is mounted in the base unit 10 so that it cannot move radially and cannot rotate. By rotating the camshaft 60, the cam 62 is essentially made to act on the cup 76, and the externally threaded spindle 54 is moved to the left. The cam 62 can preferably be manufactured with very low eccentricity, so that it takes only a low torque on the camshaft 60 to exert a high thrust on the externally threaded spindle 54, and thus, via the internally threaded sleeve 38 and the thrust body 40, on the clamping jaws 22. The torsion spring 72 applies a prestress to the camshaft 60 in a first unstressed stop position. As a result of the rotation of the camshaft 60, the cam 62 arrives at its clamping position, which in turn can be specified as the stop position of the stop pin 74, to prevent the application of any excessive clamping force.

In practice, by rotating the jaw convergence sleeve 16, the clamping jaws 22 can preferably be converged until they stop against the respective tool shank, and then the mechanism 58 to increase the clamping force can preferably be operated by rotating the camshaft 60 by means of an Allen wrench. Conversely, to release a tool, first the camshaft 60 can preferably be turned back into its unstressed position, and then, by activating the jaw convergence sleeve 16, the clamping jaws 22 can preferably be raised from the respective tool shank.

With this configuration, high clamping forces can essentially be applied between the clamping jaws 22 and the respective tool shank, so that essentially any torque requirement can be met, regardless of the direction of rotation of the tool spindle. It should also be noted that the jaw convergence sleeve 16 is preferably mounted on the base unit 10 in the axial direction, not by a ball bearing or a similar device, but by the retaining ring 18. If now, on account of the mechanism 58 which increases the clamping force, a large force is exerted on the externally threaded spindle 54, the jaw convergence sleeve 16 is also essentially exposed to a large force in relation to the base unit 10. This force is transmitted by the jaw convergence sleeve 16 to the base unit 10 through the retaining ring 18. The retaining ring 18 then essentially acts as a friction brake between the jaw convergence sleeve 16 and the base unit 10, so that a twisting of the jaw convergence sleeve 16 is prevented by this braking action, given the appropriate direction of rotation.

One generally preferable aspect of the invention as realized in this embodiment is the angular position of the thrust absorption surfaces 44 of the clamping jaws 22 and the thrust surfaces 42 of the thrust body, at the angle (alpha) indicated in FIG. 1. As a result of this angular position, an increased clamping force can be exerted on the tool shank to be clamped by the clamping jaws 22, in the area of their right ends as illustrated in FIG. 1. The angle (alpha), as illustrated in FIG. 1, is preferably chosen to produce the most favorable results, but may preferably be in a range of about 15° to about 30° and, particularly, may preferably be between about 20° and about 25°.

In the following explanation, reference is made to FIG. 4. FIG. 4 shows a clamping jaw 22, and the part designated by crosshatches is intended to represent a part of the thrust body 40. The figure also shows the angle (alpha) in relation to a surface 50 perpendicular to the axis, i.e. the angle of the thrust absorption surface 44 and of the thrust surface 42 in relation to the surface 50 perpendicular to the axis. It is now assumed that the thrust body 40 exerts a thrust $F_{thrust}$ in the axial direction A.

The jaw convergence sleeve 16 essentially exerts a reaction force of the magnitude $-F_{thrust}$ against this thrust $F_{thrust}$. By splitting the force into its components, we get the radial force $F_{clamp}$. This radial force is exerted by the clamping jaws 22 on the tool shank. In FIG. 4, the clamping force $F_{clamp}$ is indicated in the center of the axial length of the clamping jaws 22. This clamping force $F_{clamp}$ is essentially distributed over the entire axial length of the clamping jaws 22. Nevertheless, the axial clamping force of the clamping jaws 22 against the tool shank in the vicinity of the ends of the clamping jaws 22, to the right in FIG. 1 and on the bottom in FIG. 4, is essentially less than would correspond to a uniform distribution of the clamping force $F_{clamp}$ over the length of the clamping jaws 22. That is because between the thrust absorption surface 44 and the thrust surface 42, there is a friction force $F_{friction}$. This friction force $F_{friction}$ tends to oppose the compression of the clamping jaws 22 in the vicinity of their lower ends as shown in FIG. 4. This friction force $F_{friction}$ would essentially be exerted fully in the sense of reducing the clamping force $F_{clamp}$ on the lower ends of the clamping jaws 22 in FIG. 4, if the angle (alpha) were 0, i.e. if the clamping force absorption surface 44 and the clamping force surface 42 were orthogonal in relation to the axis A, as is generally the case among known arrangements. In the configuration according to the invention and illustrated in FIG. 4, however, on account of the finite size of the angle (alpha), there is a component $F_{additional\ clamping\ force}$. This additional clamping force results, as shown in FIG. 4, from an analysis of the thrust $F_{thrust}$ on the surfaces 44 and 42. This thrust component $F_{additional\ clamping\ force}$ tends to oppose the friction force $F_{friction}$, so that in spite of the inevitable friction force $F_{friction}$, the magnitude of the clamping force $F_{clamp}$ exerted by the clamping jaws 22 in the lower portion of the clamping jaws 22 in FIG. 4 can be increased. The magnitude of the clamping force component $F_{additional\ clamping\ force}$ can be varied by the selection of the size of the angle (alpha). In this manner, it essentially becomes possible to obtain a desired clamping force profile between the clamping jaws 22 and the respective tool shank over the axial length of the clamping jaws 22. The arrow "a" in FIG. 4 indicates the adjustment of the clamping jaws 22 toward the tool shank.

The finite size of the angle (alpha) can also be understood to mean that, in the contact area of surfaces 42 and 44, an additional transmission of force is essentially obtained which is greater than that which could be obtained in an embodiment in which the surfaces 42 and 44 were oriented orthogonally in relation to axis A.

An additional essential aspect of the invention is the action of the mechanism 58 to increase the clamping force $F_{clamp}$, which is described above in detail. The following information should be added with regard to this mechanism to increase the clamping force: The camshaft 60 and the cam 62 run radially or diametrically through the base unit 10. It is easily possible, by appropriately sizing the hole 64 and the camshaft 60, to achieve essentially perfect balance, in particular if the camshaft 60 is allowed to run diametrically through the entire base unit 10. That results in smoother operation. This is an essential advantage over known solutions, in which the mechanisms to clamp the clamping jaws 22 are formed by a worm gear mechanism with a worm shaft running at a tangent to the axis A.

The following is an additional preferable aspect of the invention: Both parts of the jackscrew actuator 37, which jackscrew actuator acts as the jaw convergence mechanism, i.e. both the externally threaded spindle 54 and also the internally threaded sleeve 38, are preferably mounted so that they cannot move radially backward in the base unit 10. The radial mounting of the internally threaded sleeve 38 preferably utilizes the sleeve extension 32 in the hole 34 of the base unit 10.

The radial support of the externally threaded spindle 54 in the base unit 10 is preferably essentially guaranteed by the molding 80 in a recess 81. That means that both bodies 38 and 54 are preferably supported radially, each independently of the other and independent of their threaded engagement 56. A precise radial positioning of both bodies 38 and 54 is thus essentially guaranteed, in contrast to known solutions, where one of the two bodies of a jackscrew actuator 37 is mounted in a radially fixed fashion in the base unit, but the other is radially fastened to the first one only by means of the thread. In these known solutions, a radial offset is of course conceivable, because the threads must generally be executed with some play in the threads for smooth operation. This is an additional feature which tends distinguish the device according to the invention from known chucks, on account that the running of the device of the present invention is essentially more true.

An additional aspect of the invention is that the clamping jaws 22 are preferably connected to the internally threaded sleeve 38, while the externally threaded spindle 54 is preferably torsionally fixed. That makes possible a particularly simple and compact construction.

It should also be added that as a result of the configuration of the right-hand end of the sleeve extension 32 shown in FIG. 1, the play of the externally threaded spindle 54 is limited by the radial flange 78.

The following should also be noted: As shown in FIG. 1, the internally threaded sleeve 38, with its contact with an outside circumferential surface 89, is in contact against an inside circumferential surface 90a of the guide sleeve consisting of the sleeve extension 32 and the expansion cage 28, whereby the guide sleeve in general is designated 90. It should generally be apparent that the inside circumferential surface 90a extends farther to the left into the expander cage 28, so that the internally threaded sleeve 38 is essentially in continuous contact over its entire displacement distance along axis A with the inside circumferential surface 90a, and is thereby supported radially, in particular in the area of its ends 89a. The guide sleeve 90 is radially supported in the vicinity of the sleeve extension 32 by the outside circumferential surfaces 32a on corresponding contact surfaces 34a of the hole 34 in the base unit 10. The expansion cage 28, with its conical outside circumferential surface 28a, is also preferably in contact with the conical inside circumferential surface 21 of the convergence sleeve 16, at the point where the expander cage 28 is not slotted. Since the guide sleeve 90 is essentially positioned exactly with one shoulder surface 90b on an end surface 10e of the base unit 10 in the axial direction, and since on the other hand the convergence sleeve 16 is positioned exactly by a retaining ring 18 in the axial direction, there will essentially be no danger of a constricted diameter of the inside circumferential surface 90a in the longitudinal area of the slots 36.

Since the externally threaded spindle 54 is also positioned essentially radially exactly in relation to the recess 81, a precision radial positioning of the jackscrew actuator 37 is guaranteed, regardless of the engagement of the externally threaded spindle 54 and the internally threaded sleeve 38. This is true over the entire axial range of movement of the internally threaded sleeve 38. This is particularly important, because when a tool shank is clamped, the internally threaded sleeve 38 is exposed to high compression forces, and an eccentric pressure load of the internally threaded sleeve 38 is altogether possible.

Figure 7:
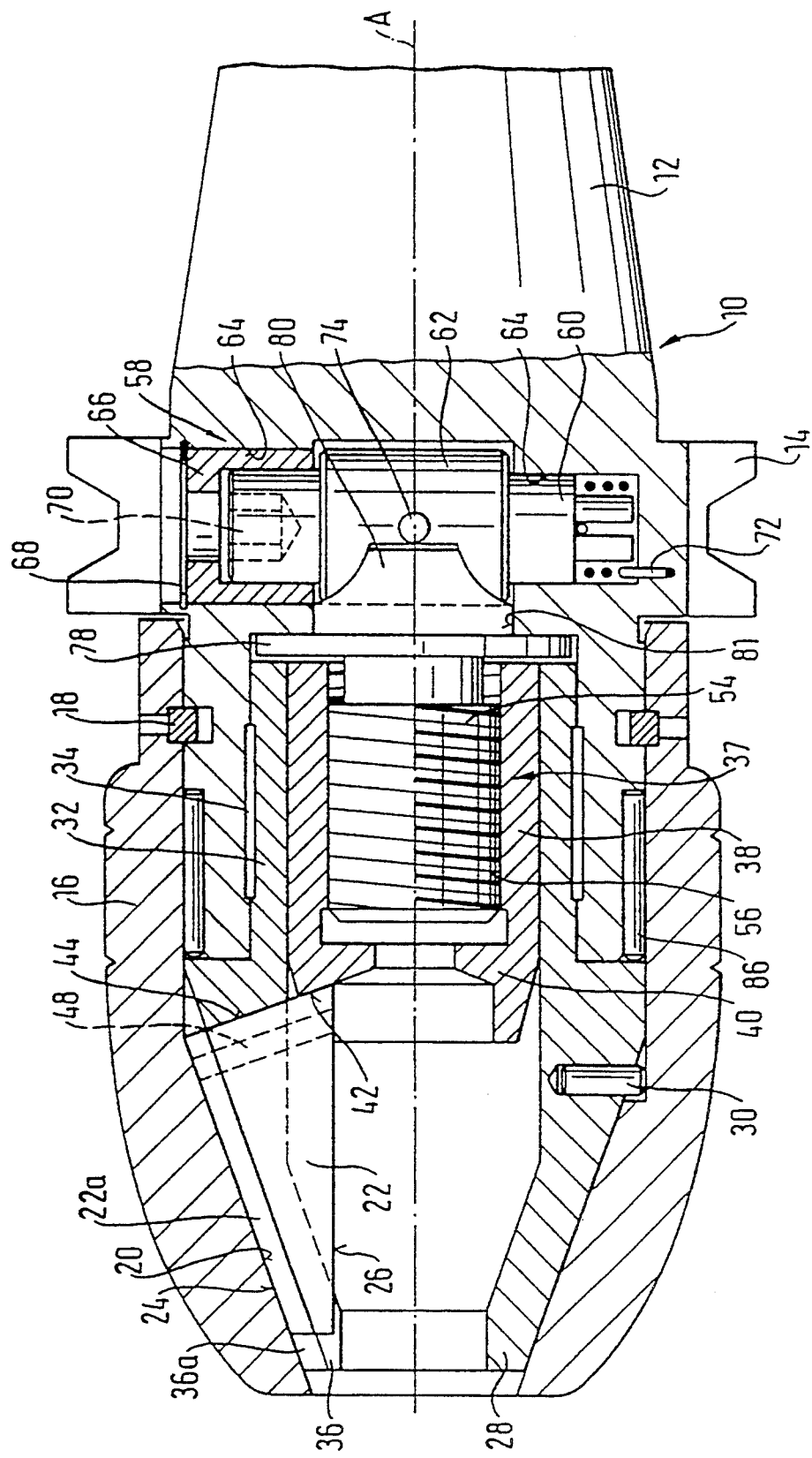
FIG. 7 is a longitudinal section, similar to the one in FIG. 1, of a different embodiment of the chuck.

An additional aspect of the invention is shown with reference to the embodiment illustrated in FIG. 7. This embodiment differs from the embodiment illustrated in FIG. 1 generally only in that the jaw convergence sleeve 16 is mounted on the base unit 10 so that it can rotate by means of a needle bearing 86. The needles 86 are set to very close tolerances, so that the axial position of the jaw convergence sleeve 16 in relation to the base unit 10 is extremely precise. This axial positioning can be significantly more precise than other known solutions. Particularly, in such known solutions, the jaw convergence sleeve is mounted on the base unit by means of cylindrical friction surfaces, because such cylindrical friction surfaces must always be sized with regard to ease of rotation, meaning that some radial play is unavoidable. This radial play can also lead to out-of-balance conditions. The elimination of such radial play according to the present invention is in turn an advantage that the running of the chuck is more true.

Figure 8:
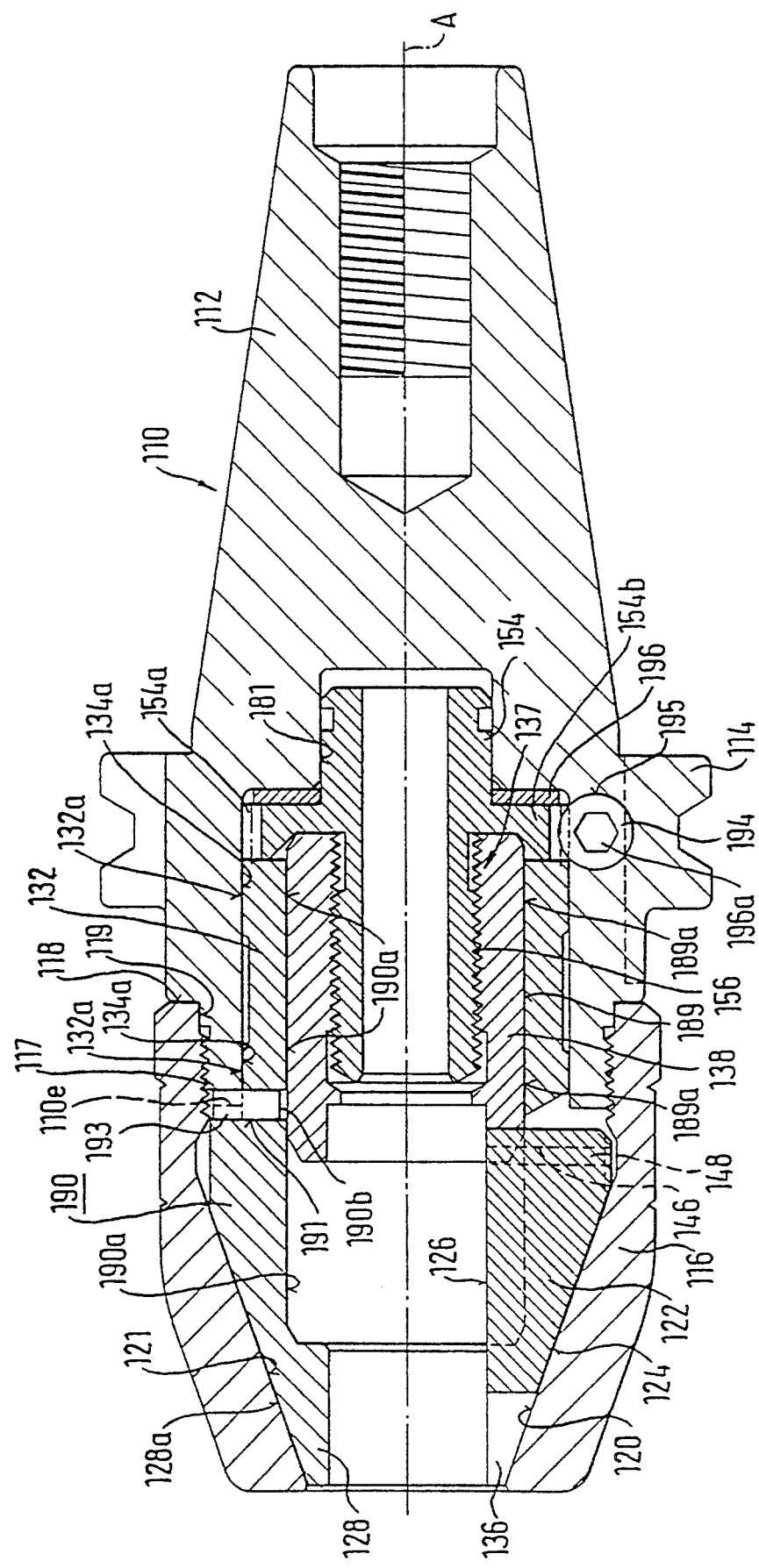
FIG. 8 is a longitudinal section of yet another embodiment.

FIG. 8 illustrates an additional embodiment, whereby parts analogous to those illustrated in FIG. 1 are identified by the same number, plus 100. In the embodiment illustrated in FIG. 8, the convergence sleeve 116 is bolted by means of a thread 117 to the base unit 110, whereby the convergence sleeve 116, at the point 118, is fixed precisely in its axial position by the engagement of its right-hand end surface with a shoulder surface on the base unit 110.

The guide sleeve 190 is also supported in a plane of contact 110e on the base unit 110 by ring-shaped surfaces perpendicular to the axis. A pin 193 is oriented radially in a hole 191 of the guide sleeve 190, namely so that the axis of the pin 193 lies in the plane of contact 110e. The radially outward segment of the pin 193 therefore lies on one hand in a semi-cylindrical surface of the base unit 110, and on the other hand in a semi-cylindrical surface of the guide sleeve 190, so that the guide sleeve is positioned so that it cannot rotate in relation to the base unit 110. For the radial centering of the convergence sleeve 116 on the base unit 110, the convergence sleeve 116 is preferably supported by a pair of circumferential surfaces 119 on the base unit 110, in axial alignment with the axis of the base unit 110.

The clamping jaws 122 held in the slots 136 are also held so that they cannot rotate in relation to the base unit 110, and thus, on account of the radial connection profiles 146, 148, the internally threaded sleeve 138 cannot rotate. However, it can still move axially together with the clamping jaws 122, and if the externally threaded body 138 moves to the left, the clamping jaws 122 are actuated radially inward, as a result of the engagement of the clamping jaws 122 with the convergence tracks 120, and if the internally threaded sleeve 138 moves to the right, the clamping jaws 122 are actuated radially outward, as a result of the engagement of the clamping jaws 122 with the expansion cage 128. This engagement can be configured just as shown in FIG. 2. The engagement profiles 146, 148 also include a thrust surface corresponding to the thrust surface 42, and a thrust absorption surface corresponding to the thrust absorption surface 44 illustrated in FIGS. 1 to 4. It should be noted, however, that the orientation of the matching profiles 146, 148 inclined at an acute angle to the axis, as shown in the embodiment illustrated in FIGS. 1 to 4, has not been used here, although it could be. The matching profiles 146, 148 here run in a plane which is essentially perpendicular to axis A.

The internally threaded sleeve 138 can therefore be moved only in the direction of axis A; it cannot be rotated. It is moved by means of the thread 156, and by the rotation of the externally threaded spindle 154. The externally threaded spindle 154 is equipped for this purpose with a worm gear 154a. This worm gear 154a is engaged with a worm shaft 194, which is held so that it cannot move in its lengthwise direction in a hole 195 in the base unit 110, and has an Allen screw 196a which is accessible from the outside circumferential surface of the base unit 110. The worm shaft 194 can be turned by means of a lathe tool (not shown), and thus the externally threaded spindle can also be rotated, so that the internally threaded sleeve 180 can be adjusted without rotation in the axial direction, as a function of the direction of rotation of the worm shaft 194, either to the left, i.e. for clamping, or to the right, i.e. for releasing. It is apparent that the internally threaded sleeve 138, with its outside circumference surface areas 189*a* near the end, can be radially supported over its entire axial range of movement by the inside circumference surface 190*a* of the guide sleeve 190, even if the left terminal section 189*a* is inside the expansion cage 128.

One feature of the invention resides broadly in the chuck, consisting of a base unit 10;110 with an axis A, whereby this base unit 10;110 is designed for external mounting on a chuck mounting, in particular of a machine tool, in which a jaw convergence sleeve 16;116 is centrally located on the base unit 10;110, in which axially movable clamping jaws 22:122 are also located inside the jaw convergence sleeve 16;116, in which also, for the axial movement of the clamping jaws 22;122 in the direction of clamping and releasing, there is a jackscrew actuator 37;137 extending along the axis, which moves axially with the clamping jaws 22;122, but which allows an essential radial movement of the clamping jaws 22;122 in relation to it, in which the clamping jaws 22;122 are also guided by means of radially outward friction surfaces 24;124 on the inside of the jaw convergence sleeve 16;116 on convergence tracks 22;122, which enclose an acute angle with the axis A, so that the clamping jaws 22;122 are moved radially inward for movement in the clamping direction, in which also, inside the jaw convergence sleeve 16;116, jaw expansion means 28,36*a*;128 are engaged with the clamping jaws 22;122, so that the clamping jaws 22;122 are moved radially outward for a movement in the release direction, in which the jackscrew actuator 37;137 consists of an externally-threaded spindle 54;154 which can be axially supported against the base unit 10;110, as well as an internally threaded sleeve 38;138 which is connected to the clamping jaws 22;122 by a connection 42,44 which transmits the clamping force, and by a connection 46,48;146,148 which transmits the releasing force, in which the internally threaded sleeve 38;138 is guided on an inside circumferential surface 90*a*;1-90*a* which centers it in relation to the base unit 10;110, and in which the externally threaded spindle 54;154 is also centered on the base unit 10;110, independently of the threaded engagement with the internally threaded sleeve 38;138, characterized by the fact that the inside circumferential surface 90*a*,190*a* which centers the internally threaded sleeve 38;138 is fabricated on a guide sleeve 90;190, which is designed in the vicinity of the jaw convergence sleeve 16;116 with radial slots 36;136 in the manner of an expansion cage 28;128 for the clamping jaws 22;122 which forms the clamping jaw expansion means, and is designed in an adjacent area as a sleeve extension 32;132 with an outside circumferential surface 32*a*;132*a* centered on the base unit 10;110, and which overlaps the threaded engagement between the externally threaded spindle 54;154 and the internally threaded sleeve 38;138 in the axial direction, and that the inside circumferential surface 90*a*;190*a* centering the internally threaded sleeve 38;138, both in the vicinity of the sleeve extension 32;132—this area overlapping the threaded engagement between the internally threaded sleeve 38;138 and the externally threaded spindle 54;154—and also in the vicinity of the expansion cage 28;128 on the guide sleeve 90;190 is designed so that the internally threaded sleeve 38;138 is radially supported in every axial position, at least on the two axially projecting end regions 89*a*;189*a* of its outside circumferential surface 89,189 on the inside circumferential surface 90*a*;190*a* which centers it.

Another feature of the invention resides broadly in the chuck, characterized by the fact that the expansion cage 28;128 is centered by means of a conical outside circumferential surface 28*a*;1-28*a* on a conical inside circumferential surface 21;121 of the convergence sleeve 16;116.

Still another feature of the invention resides broadly in the chuck, characterized by the fact that the guide sleeve 90;190, in particular in the vicinity of a transition shoulder 90*b*;190*b* between the expansion cage 28;128 and the sleeve extension 32;132 is positioned axially against a stop surface 10*e*;110*e* of the base unit 10;110.

Yet still another feature of the invention resides broadly in the chuck, characterized by the fact that the convergence sleeve 16;116 is axially positioned against a stop surface 18;118 of the base unit 10;110 and/or that the convergence sleeve 16;116 is centered on the base unit 10;110 by a pair of circumferential surfaces at 119 in contact with one another.

Another feature of the invention resides broadly in the chuck, characterized by the fact that the internally threaded sleeve 38;138 is in contact in every axial position, essentially over its entire length, with the inside circumferential surface 90*a*;190*a* centering it.

Still another feature of the invention resides broadly in the chuck, characterized by the fact that the guide sleeve 90 is connected at 30 to the convergence sleeve 16 so that they rotate together, that the convergence sleeve 16 is mounted so that it can rotate, but is axially immovable on the base unit 10, that the internally threaded sleeve 38 is connected by means of the clamping jaws 22 so that it rotates together with the convergence sleeve 16, and that the externally threaded spindle 54 is fixed on the base unit 10 so that it cannot rotate.

Yet still another feature of the invention resides broadly in the chuck, characterized by the fact that the convergence sleeve 116 is connected to the base unit 110 so that it cannot rotate, that the guide sleeve 190 is fixed so that it cannot rotate in relation to the base unit 110, that the internally threaded sleeve 138 is fastened by means of the clamping jaws 122 to the guide sleeve 190 so that it cannot rotate, and that the externally threaded spindle 154 is mounted so that it can rotate in the base unit 110, and can be driven by external drive means 194,196*e*.

Another feature of the invention resides broadly in the chuck, characterized by the fact that the drive means 194,196a comprise a worm shaft 194 mounted so that it can rotate in the base unit 119, and intersecting the axis a of the base unit 119, and which is engaged with a worm gear 154a of the externally threaded spindle 154, and has a control mechanism 196 accessible from the outside.

Examples of machine tools and/or lathes, such as numerically controlled lathes, and components therefor, which may be utilized in accordance with the embodiments of the present invention, may be found in the following U.S. Pat. Nos. 5,165,313, which issued to Karr on Nov. 24, 1992; 4,554,495, which issued to Davis on Nov. 19, 1985; 4,532,692, which issued to Miyachi on Aug. 6, 1985; 4,529,342, which issued to Babel on Jul. 16, 1985; 4,475,852, which issued to Koppelmann on Oct. 9, 1984; and 4,351,096, which issued to Depweg et al. on Sep. 28, 1992.

All, or substantially all, of the components and methods of the various embodiments may be used with at least one embodiment or all of the embodiments described herein.

All of the patents, patent applications and publications recited herein, and in the Declaration attached hereto, are hereby incorporated by reference as if set forth in their entirety herein.

The corresponding foreign and international patent applications, namely, Federal Republic of Germany Patent Application No. 41 10 894 and International Application No. PCT/EP92/00756, as well as their presently and future published equivalents, and other equivalents or corresponding applications, if any, in corresponding cases in the Federal Republic of Germany and elsewhere, and the references cited in the corresponding PCT search report, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Chuck for being mounted on a tool and for clamping about an object, said chuck comprising:
   a central longitudinal axis;
   base unit means for being mounted on the tool;
   jaw convergence means being disposed within said base unit means;
   a plurality of clamping jaws being mounted within said jaw convergence means, said clamping jaws being movable along said longitudinal axis;
   said jaw convergence means being configured for radially converging said clamping jaws upon axial movement of said clamping jaws, to effect clamping of said clamping jaws about the object;
   thrust means for axially displacing said clamping jaws to effect clamping of said clamping jaws about the object;
   spindle means being threadedly engaged with said thrust means for axially displacing said thrust means to thus displace said clamping jaws;
   means for effecting relative rotational displacement between said spindle means and said thrust means to axially displace said thrust means;
   guide sleeve means for guiding the axial displacement of said thrust means;
   said guide sleeve means comprising an axial cylindrical passage for guiding the axial displacement of said thrust means, said thrust means being disposed within said axial cylindrical passage;
   said thrust means comprising a first end portion and a second end portion, said first end portion being disposed towards said clamping jaws and said second end portion being disposed away from said clamping jaws;
   said thrust means being radially supported by said guide sleeve means at least at said first end portion and said second end portion;
   said first end portion of said thrust means extending substantially completely around said axial cylindrical passage such that said thrust means makes radial contact with, and is radially supported by, said guide sleeve means at said first end portion;
   said second end portion of said thrust means extending substantially completely around said axial cylindrical passage such that said thrust means makes radial contact with, and is radially supported by, said guide sleeve means at said second end portion;
   said first end portion and said second end portion making contact with said guide sleeve means along one unitary structure of said guide sleeve means.

2. The chuck according to claim 1, wherein:
   said axial cylindrical passage is disposed to center said thrust means about the longitudinal axis;
   said chuck has a front portion and a rear portion, said front portion for being disposed axially towards the workpiece, said rear portion for being disposed axially away from the workpiece;
   said chuck comprises a front end at said front portion of said chuck, said clamping jaws for being extended out through said front end of said chuck;
   said axial cylindrical passage comprises a first end disposed towards said front end of said chuck and a second end disposed opposite said first end;
   said jaw convergence means extends and from said front end of said chuck to said front end of said axial cylindrical passage;
   said guide sleeve means is configured for supporting said first end portion of said thrust means at said first end of said axial cylindrical passage, adjacent said jaw convergence means;
   both said first end portion of said thrust means and said second end portion of said thrust means have a substantially circular cross-section;
   both said first end portion of said thrust means and said second end portion of said thrust means being substantially concentric with respect to said axial cylindrical passage;
   said guide sleeve means is an extension of said jaw convergence means, such that said guide sleeve means and said jaw convergence means form a single, integrated unit;
   said jaw convergence means comprises means for permitting expansion of said clamping jaws apart from one another upon displacement of said thrust means in an axial direction away from said front end of said chuck;
   said means for permitting expansion of said clamping jaws comprises slot means;
   said slot means comprise means for accommodating a portion of each of said clamping jaws to guide axial and radial movement of said clamping jaws;

said base unit means comprises a base unit and an outer sleeve;

said outer sleeve being mounted on said base unit;

said outer sleeve comprises an inner surface portion and an outer surface portion;

said inner surface portion of said outer sleeve has a generally conical shape in said front portion of said chuck;

said jaw convergence means is centered about the longitudinal axis by said inner surface portion of said outer sleeve;

said chuck has an axial direction defined along the central longitudinal axis;

said thrust means and said spindle means are for being threadedly engaged along an area of threaded engagement, said area of threaded engagement being substantially fixed with respect to the axial direction of said chuck; and said guide sleeve means is disposed to overlap said area of threaded engagement of said thrust means and said spindle means;

said single, integrated unit formed by said jaw convergence means and said guide sleeve means comprises an annular shoulder portion;

said base unit means comprises an annular stop surface portion;

said annular shoulder portion is interfaced with said annular stop surface portion;

said annular shoulder portion is a transition between said jaw convergence means and said guide sleeve means;

said chuck comprises means for centering said outer sleeve about the longitudinal axis of said chuck;

said centering means comprises at least one of:
  stop surface means being mounted on said base unit, said stop surface means being configured for holding said said outer sleeve on said base unit; and
  first and second circumferential surface means, said outer sleeve comprising said first circumferential surface means, said base unit comprising said second circumferential surface means, said first and second circumferential surface means being interfaced with one another;

said thrust means is generally cylindrical;

said thrust means comprises a major portion extending between said first end portion and said second end portion;

said first end portion of said thrust means and said second end portion of said thrust means are both flush with said major portion of said thrust means such that said first end portion of said thrust means, said second end portion of said thrust means, and said major portion of said thrust means are all radially supported by said guide sleeve means throughout the entire axial extent of said thrust means;

said spindle means and said thrust means collectively comprise jackscrew actuator means;

each of said clamping jaws comprises a friction surface, said friction surface being engaged with said jaw convergence means;

each of said friction surfaces defines an acute angle with respect to the central longitudinal axis;

said outer sleeve comprises a front end and a rear end, said front end being disposed towards said front end portion of said chuck and said rear end being disposed opposite said front end portion;

said rear end of said outer sleeve is mounted about, and surrounds, said base unit means;

said jaw convergence means has a generally conical shape;

said jaw convergence means has an outward surface defined by said generally conical shape;

said outward surface of said jaw convergence means for being substantially fully interfaced with said inner surface portion of said outer sleeve;

said jaw convergence means defining a first diameter at said annular shoulder portion;

said guide sleeve means defining a second diameter at said annular shoulder portion;

said second diameter being less than said first diameter, said annular shoulder portion being a transition between said first diameter and said second diameter;

said annular shoulder portion being oriented perpendicularly with respect to the central longitudinal axis of said chuck;

said base unit having a front portion and a rear portion;

said front portion of said base unit being sandwiched between said rear end of said outer sleeve and said guide sleeve means;

said chuck comprises means for connecting said guide sleeve means with said outer sleeve;

said connecting means is configured for permitting simultaneous rotation of said guide sleeve means and said outer sleeve;

said outer sleeve is fixed in the axial direction of said chuck;

said thrust means is connected by means of said clamping jaws so as to be able to rotate simultaneously with said outer sleeve; and said spindle means is non-rotatable with respect to said base unit means.

3. Chuck, consisting of a base unit (10;110) with an axis (A), whereby this base unit (10:110) is designed for external mounting on a chuck mounting, in particular of a machine tool, in which a jaw convergence sleeve (16;116) is centrally located on the base unit (10;110), in which axially movable clamping jaws (22:122) are also located inside the jaw convergence sleeve (16;116), in which also, for the axial movement of the clamping jaws (22;122) in the direction of clamping and releasing, there is a jackscrew actuator (37;137) extending along the axis, which moves axially with the clamping jaws (22;122), but which allows an essential radial movement of the clamping jaws (22;122) in relation to it, in which the clamping jaws (22;122) are also guided by means of radially outward friction surfaces (24;124) on the inside of the jaw convergence sleeve (16;116) on convergence tracks (20;120), which enclose an acute angle with the axis (A), so that the clamping jaws (22;122) are moved radially inward for movement in the clamping direction, in which also, inside the jaw convergence sleeve (16;116), jaw expansion means (28,36a;128) are engaged with the clamping jaws (22;122), so that the clamping jaws (22;122) are moved radially outward for a movement in the release direction, in which the jackscrew actuator (37;137) consists of an externally-threaded spindle (54;154) which can be axially supported against the base unit (10;110), as well as an internally threaded sleeve (38;138) which is connected to the clamping jaws (22;122) by a connection (42,44) which transmits the clamping force, and by a connection (46,48;146,148) which transmits the releasing force, in which the internally threaded sleeve (38;138) is guided on an inside circumferential surface (90a;190a) which centers it in relation to the base unit (10;110), and in which the externally threaded spindle (54;154) is also centered on the base unit (10;110), independently of the threaded engagement with the internally threaded sleeve (38;138), characterized by the fact that the inside circumferential surface (90a,190a) which centers the internally threaded sleeve (38;138) is fabricated on a guide sleeve (90;190), which is designed in the vicinity of the jaw convergence sleeve (16;116) with radial slots (36;136) in the manner of an expansion cage (28;128) for the clamping jaws (22;122) which forms the clamping jaw expansion means, and is designed in an adjacent area as a sleeve extension (32;132) with an outside circumferential surface (32a;132a) centered on the base unit (10;110), and which overlaps the threaded engagement between the externally threaded spindle (54;154) and the internally threaded sleeve (38;138) in the axial direction, and that the inside circumferential surface (90a;190a) centering the internally threaded sleeve (38;138), both in the vicinity of the sleeve extension (32;132)—in this area overlapping the threaded engagement between the internally threaded sleeve (38;138) and the externally threaded spindle (54;154)—and also in the vicinity of the expansion cage (28;128) on the guide sleeve (90;190) is designed so that the internally threaded sleeve (38;138) is radially supported in every axial position, at least on the two axially separated end regions (89a;189a) of its outside circumferential surface (89,189) on the inside circumferential surface (90a;190a) which centers it;

said two axially separated end regions making contact with said guide sleeve along one unitary structure of said guide sleeve.

4. Chuck as claimed in claim 3,
characterized by the fact
that the expansion cage (28;128) is centered by means of a conical outside circumferential surface (28a;128a) on a conical inside circumferential surface (21;121) of the convergence sleeve (16;116).

5. Chuck as claimed in claim 3,
characterized by the fact
that the guide sleeve (90;190), in particular in the vicinity of a transition shoulder (90b;190b) between the expansion cage (28;128) and the sleeve extension (32;132) is positioned axially against a stop surface (10e;110e) of the base unit (10;110).

6. Chuck as claimed in claim 3,
characterized by the fact
that the convergence sleeve (16;116) is axially positioned against a stop surface (18;118) of the base unit (10;110) and/or that the convergence sleeve (16;116) is centered on the base unit (10;110) by a pair of circumferential surfaces (at 119) in contact with one another.

7. Chuck as claimed in claim 3,
characterized by the fact that the internally threaded sleeve (38;138) is in contact in every axial position, essentially over its entire length, with the inside circumferential surface (90a;190a) centering it.

8. Chuck as claimed in claim 3,
characterized by the fact
that the guide sleeve (90) is connected (at 30) to the convergence sleeve (16) so that they rotate together,
that the convergence sleeve (16) is mounted so that it can rotate, but is axially immovable on the base unit (10), that the internally threaded sleeve (38) is connected by means of the clamping jaws (22) so that it rotates together with the convergence sleeve (16), and that the externally threaded spindle (54) is fixed on the base unit (10) so that it cannot rotate.

9. Chuck as claimed in claim 3,
characterized by the fact
that the convergence sleeve (116) is connected to the base unit (110) so that it cannot rotate, that the guide sleeve (190) is fixed so that it cannot rotate in relation to the base unit (110), that the internally threaded sleeve (138) is fastened by means of the clamping jaws (122) to the guide sleeve (190) so that it cannot rotate, and that the externally threaded spindle (154) is mounted so that it can rotate in the base unit (110), and can be driven by external drive means (194,196a).

10. Chuck as claimed in claim 9,
characterized by the fact
that the drive means (194,196a) comprise a worm shaft (194) mounted so that it can rotate in the base unit (110), and intersecting the axis (A) of the base unit (110), and which is engaged with a worm gear (154a) of the externally threaded spindle (154), and has a control mechanism (196) accessible from the outside.

11. Chuck as claimed in claim 3,
characterized by a mechanism (58) to increase the clamping force which acts on the jackscrew (37), which can be actuated to increase a clamping force to be exerted by the clamping jaws (22) on the respective tool shank.

12. Chuck as claimed in claim 11,
characterized by the fact
that the mechanism (58) to increase the clamping force is designed as a cam transmission, which comprises a camshaft (60) which is mounted in the base unit (10) essentially radially in relation to the axis of the base unit (10) with a cam (62) which pushes the jackscrew actuator (37) in the axial direction.

13. Chuck as claimed in claim 12,
characterized by the fact
that the cam (62) on the end of the jackscrew actuator (37) farther from the clamping jaws (22) is engaged with the externally threaded spindle (54).

14. Chuck as claimed in claim 12,
characterized by the fact
that the camshaft (60) is realized with engagement surfaces (70) for the engagement of a clamping tool.

15. Chuck as claimed in claim 12,
characterized by the fact
that the camshaft (60) extends essentially over the entire diameter of the base unit (10).

16. Chuck as claimed in claim 12,
characterized by the fact that the camshaft (60) is prestressed by prestressing means (70) in a non-clamping angular position.

17. Chuck as claimed in claim 11,
characterized by the fact
that the mechanism to increase the clamping force is designed as a sliding wedge transmission.

18. Chuck as claimed in claim 11,
characterized by the fact
that the mechanism to increase the clamping force is designed as a worm gear transmission.

19. Chuck as claimed in claim 11,
characterized by the fact
that the mechanism to increase the clamping force is designed as a toggle lever transmission.

20. Chuck as claimed in claim 8,
characterized by the fact
that there is a mechanism (58) to increase the clamping force, which comprises a camshaft (60) mounted in the base unit (10) essentially radially in relation to the axis of the base unit (10), with a cam (62) which presses the jackscrew actuator (37) in the axial direction, whereby the cam (62) on the end of the jackscrew actuator (37) farther from the clamping jaws (22) is engaged with the externally threaded spindle.

21. Chuck comprising a base unit (10) with an axis (A), whereby this base unit (10) has an add-on piece (12) for the mounting of the base unit (10) on a chuck holder, in particular of a machine tool, whereby also on the end of the base unit (10) farther from the add-on piece (12) there is a jaw convergence sleeve (16), whereby also inside the jaw convergence sleeve (16), clamping jaws are located (22), whereby the clamping jaws (22) are guided by means of radially outward friction surfaces (24) on the inside of the jaw convergence sleeve (16) on convergence rails (20) which enclose an acute angle with the axis (A), whereby the clamping jaws (22) also have radially inner tool clamping surfaces (26) for the radial clamping force to be exerted on the shank of a tool, whereby the clamping jaws (22), on the ends closer to the add-on piece (12) also have thrust absorption surfaces (44), whereby the thrust absorption surfaces (44) of the clamping jaws (22) are opposite thrust exertion surfaces (42) of a thrust body (40), whereby the thrust exertion body (40) can be moved by drive means (37, 58) axially in relation to the jaw convergence sleeve (16), to bring the clamping jaws closer to the respective shank and to exert the clamping force on the tool clamping surfaces,
characterized by the fact
that the drive means (37, 58) comprise a clamping jaw convergence mechanism (37) and a mechanism (58) to increase the clamping force, whereby the mechanism (58) to increase the clamping force comprises a camshaft (60) which is mounted in the base unit (10) essentially radially in relation to the axis of the base unit (10), with a cam (62), and whereby the clamping jaw convergence mechanism (37) is supported on this cam (62).

* * * * *

UNITED STATES PATENT AND TRADEMARK OFFICE
CERTIFICATE OF CORRECTION

PATENT NO. : 5,443,275
DATED : August 22, 1995
INVENTOR(S) : Karl-Heinz KNOBL and Dieter SCHEUTHLE It is certified that error appears in the above-indentified patent and that said Letters Patent is hereby corrected as shown below:

On the title page, item [73], before 'Dietmannsried,' delete "Soderwerkzeuge," and insert --Sonderwerkzeuge--.

Signed and Sealed this

Nineteenth Day of November, 1996

Attest:

BRUCE LEHMAN

*Attesting Officer*     *Commissioner of Patents and Trademarks*